(12) United States Patent
Coffin et al.

(10) Patent No.: US 9,057,284 B2
(45) Date of Patent: Jun. 16, 2015

(54) MANIFOLD FOR GEARED TURBOFAN ENGINE

(75) Inventors: James B. Coffin, Windsor, CT (US); Tony Haugh, Farmington, CT (US)

(73) Assignee: United Technologies Corporation, Hartford, CT (US)

( * ) Notice: Subject to any disclaimer, the term of this patent is extended or adjusted under 35 U.S.C. 154(b) by 638 days.

(21) Appl. No.: 13/460,077

(22) Filed: Apr. 30, 2012

(65) Prior Publication Data

US 2013/0287553 A1 Oct. 31, 2013

(51) Int. Cl.
| | |
|---|---|
| F01D 25/18 | (2006.01) |
| F04D 29/06 | (2006.01) |
| F02K 3/06 | (2006.01) |
| F01D 15/12 | (2006.01) |
| F01D 25/20 | (2006.01) |

(52) U.S. Cl.
CPC . F01D 25/18 (2013.01); F02K 3/06 (2013.01); F05D 2260/4031 (2013.01)

(58) Field of Classification Search
CPC .............................. F04D 29/06; F05D 2260/98
USPC .................................... 415/122.1; 416/170 R
See application file for complete search history.

(56) References Cited

U.S. PATENT DOCUMENTS

| | | |
|---|---|---|
| 5,643,126 A | 7/1997 | Hotta et al. |
| 6,223,616 B1 | 5/2001 | Sheridan |
| 7,752,959 B1 | 7/2010 | Roth |
| 7,861,827 B2 | 1/2011 | Madge et al. |
| 7,883,439 B2 | 2/2011 | Sheridan et al. |
| 8,083,030 B2 | 12/2011 | Portlock |
| 2008/0006018 A1 * | 1/2008 | Sheridan et al. ............... 60/39.1 |
| 2009/0090096 A1 | 4/2009 | Sheridan et al. |
| 2009/0114480 A1 | 5/2009 | Madge et al. |
| 2010/0007151 A1 | 1/2010 | Ciszak et al. |
| 2010/0317477 A1 | 12/2010 | Sheridan et al. |
| 2010/0317478 A1 | 12/2010 | McCune et al. |
| 2010/0331140 A1 | 12/2010 | McCune |
| 2011/0108360 A1 | 5/2011 | Dibenedetto |
| 2013/0051984 A1 * | 2/2013 | McCune et al. ........... 415/122.1 |

OTHER PUBLICATIONS

International Search Report and Written Opinion for application No. PCT/US2013/037918 mailing date of Jul. 25, 2013.
International Preliminary Report on Patentability for PCT Application No. PCT/US2013/037918, mailed Nov. 13, 2014.

* cited by examiner

*Primary Examiner* — Edward Look
*Assistant Examiner* — Jason Davis
(74) *Attorney, Agent, or Firm* — Carlson, Gaskey & Olds, P.C.

(57) ABSTRACT

A geared architecture for a gas turbine engine includes a lubricant manifold for directing lubricant flow to the geared architecture. The manifold including annular channel and a bowl member received within the annular channel for defining a passage for directing lubricant.

20 Claims, 4 Drawing Sheets

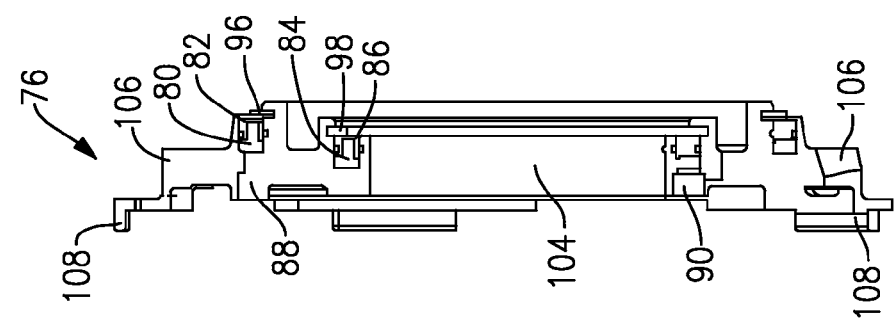
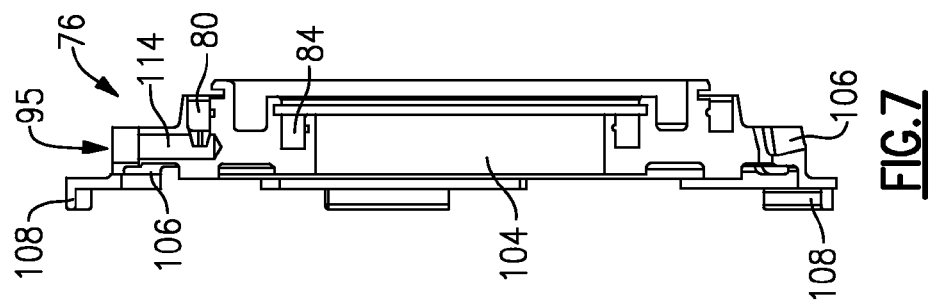
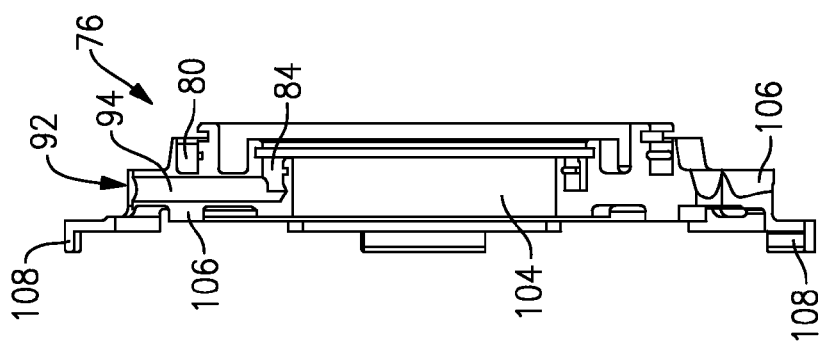
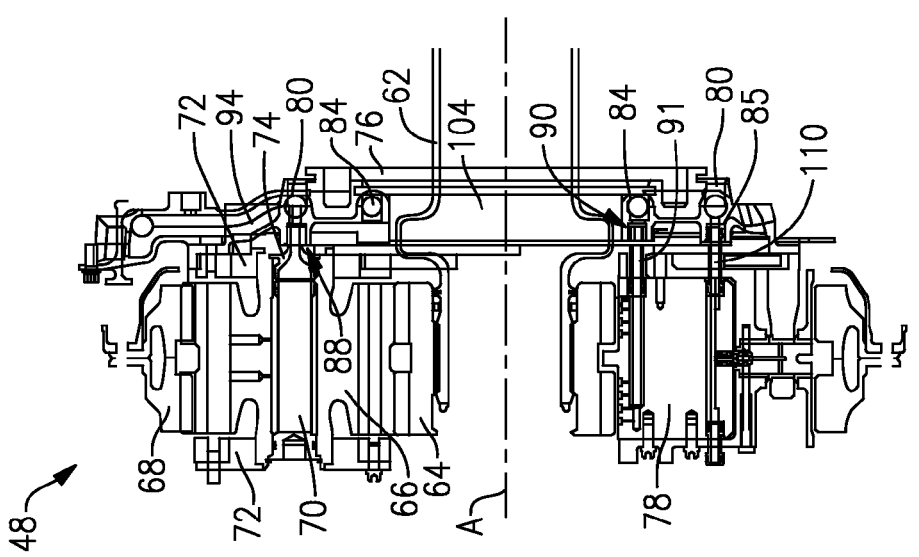

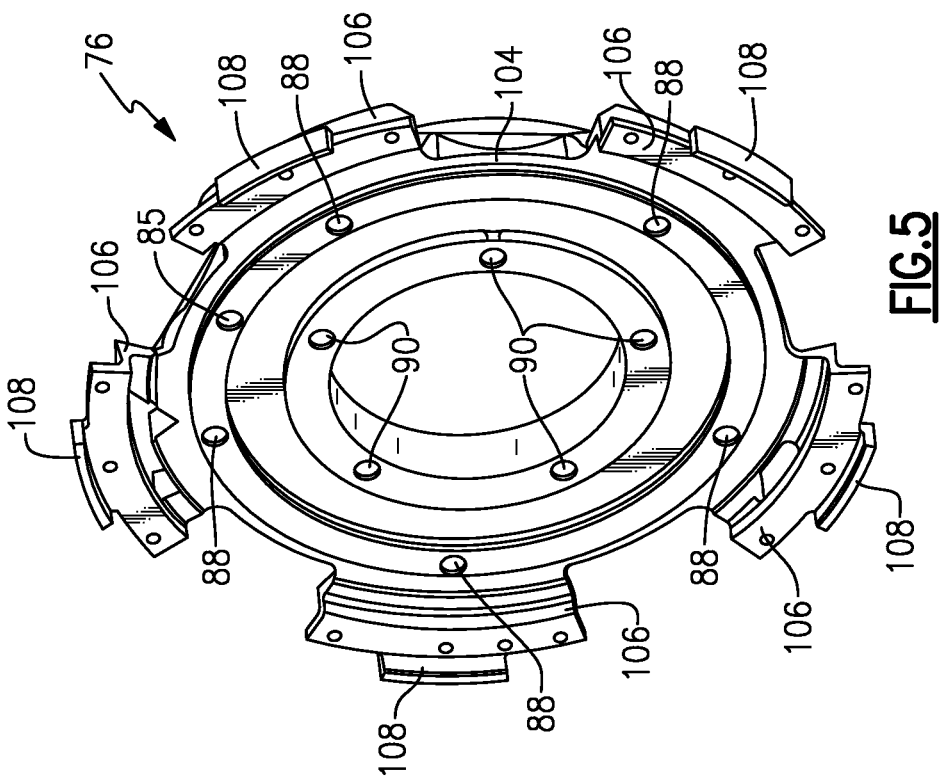
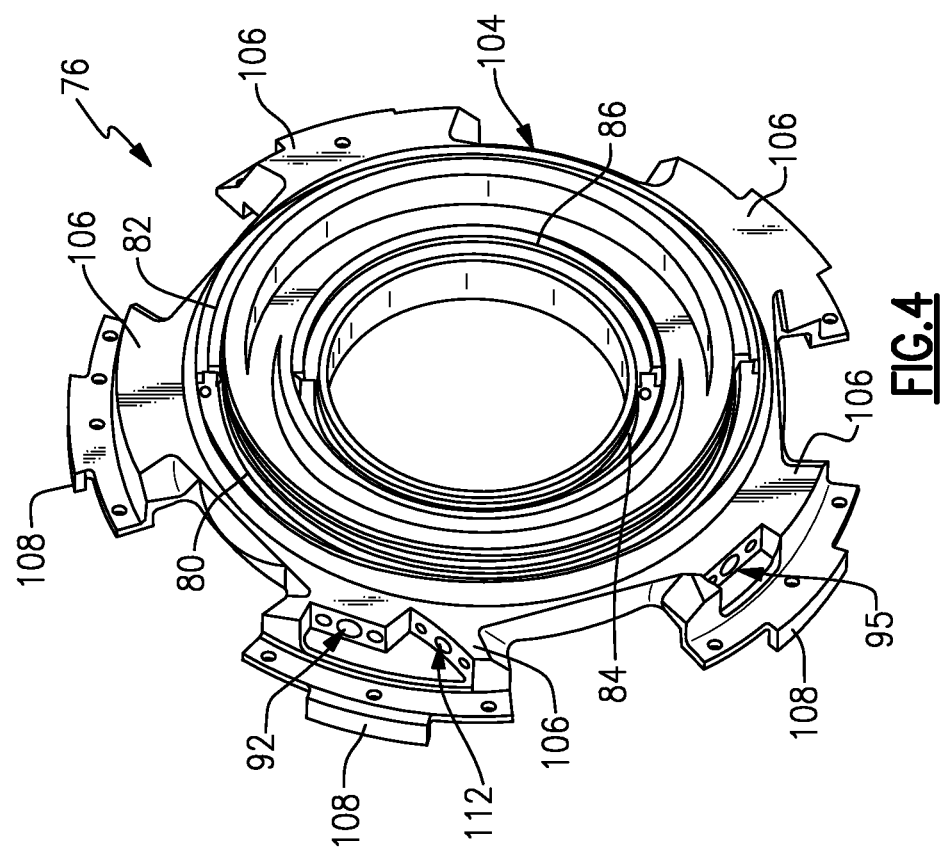

MANIFOLD FOR GEARED TURBOFAN ENGINE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Structures and conduits that communicate lubricant to the geared architecture are attached to the geared structure and to fixed structures of the engine. Typical conduits are manufactured as cast articles with a lost core casting process. Castings produced with such processes include enclosed channels and passages that are difficult to inspect and clean. Accordingly, it is desirable to design and develop lubricant conduits and structures that simplify manufacture and inspection.

SUMMARY

A gas turbine engine according to an exemplary embodiment of this disclosure, among other possible things includes a fan including a plurality of fan blades rotatable about an axis, a compressor section, a combustor in fluid communication with the compressor section, a turbine section in fluid communication with the combustor, a geared architecture driven by the turbine section for rotating the fan about the axis, and a manifold defining passages for directing lubricant flow to the geared architecture, the manifold including at least one annular channel and a bowl member received within the annular channel for defining at least one passage for directing lubricant.

A further embodiment of the foregoing gas turbine engine, including a retainer engaged to the manifold for holding the channel bowl member within the annular channel.

A further embodiment of any of the foregoing gas turbine engines, wherein the bowl member comprises a C-shaped or U-shaped cross-section.

A further embodiment of any of the foregoing gas turbine engines, wherein the manifold includes first and second annular channels and first and second bowl members received within a corresponding one of the first and second annular channels.

A further embodiment of any of the foregoing gas turbine engines, wherein each of the first and second annular channels comprises a full circumferential channel.

A further embodiment of any of the foregoing gas turbine engines, wherein the geared architecture includes a plurality of star gears supported by a corresponding plurality of journal pins, and wherein a jump tube is attached to each of the journal pins for communicating lubricant from the annular channel to the corresponding journal pin.

A further embodiment of any of the foregoing gas turbine engines, including at least one spray bar in communication with the annular channel for applying lubricant to an interface between gears of the geared architecture.

A further embodiment of any of the foregoing gas turbine engines, including a carrier for supporting gears of the geared architecture, wherein the manifold includes at least one radially extending flange for mounting the manifold to the carrier.

A further embodiment of any of the foregoing gas turbine engines, including at least one seal for sealing the interface between the bowl member and the annular channel.

A further embodiment of any of the foregoing gas turbine engines, wherein the at least one seal includes an outer seal and an inner seal.

A gear system for a gas turbine engine according to an exemplary embodiment of this disclosure, among other possible things includes a sun gear, a plurality of gears drivable by the sun gear, a carrier supporting the plurality of gears, and a manifold attached to the carrier for communicating lubricant, the manifold including a hub with a first channel and a first bowl member received within the first channel for defining a first lubricant passage.

A further embodiment of the foregoing gear system, including a second channel and a second bowl member received within the second channel for defining a second lubricant passage.

A further embodiment of any of the foregoing gear systems, wherein at least one of the first and second channels comprises an annular channel extending circumferentially about the hub.

A further embodiment of any of the foregoing gear systems, wherein the first bowl member and the second bowl member comprise a C-shaped and/or U-shaped cross-section.

A further embodiment of any of the foregoing gear systems, comprising a plurality of journal pins, wherein each of the journal pins corresponds to, and supports rotation of, a corresponding one of the plurality of gears.

A further embodiment of any of the foregoing gear systems, including a plurality of outlets in communication with the first lubricant passage and a jump tube engaged with each of the journal pins, wherein an end of each of the jump tubes is received within a corresponding one of the plurality of outlets.

A further embodiment of any of the foregoing gear systems, comprising a carrier supporting the journal pins.

A further embodiment of any of the foregoing gear systems, including a plurality of flanges extending radially outward from the hub for attachment to the carrier.

A further embodiment of any of the foregoing gear systems, including an inlet for supplying lubricant to at least the first lubricant passage disposed within at least one of the plurality of flanges.

A further embodiment of the foregoing gear system, wherein the plurality of gears are star gears.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a cross-section of an example geared architecture and lubricant manifold.

FIG. 4 is a perspective front view of the example lubricant manifold.

FIG. 5 is a perspective rear view of the example lubricant manifold.

FIG. 6 is a cross-section of the example lubricant manifold.

FIG. 7 is another cross-section of the example lubricant manifold.

FIG. 8 is yet another cross-section of the example lubricant manifold.

DETAILED DESCRIPTION

Figure 1:
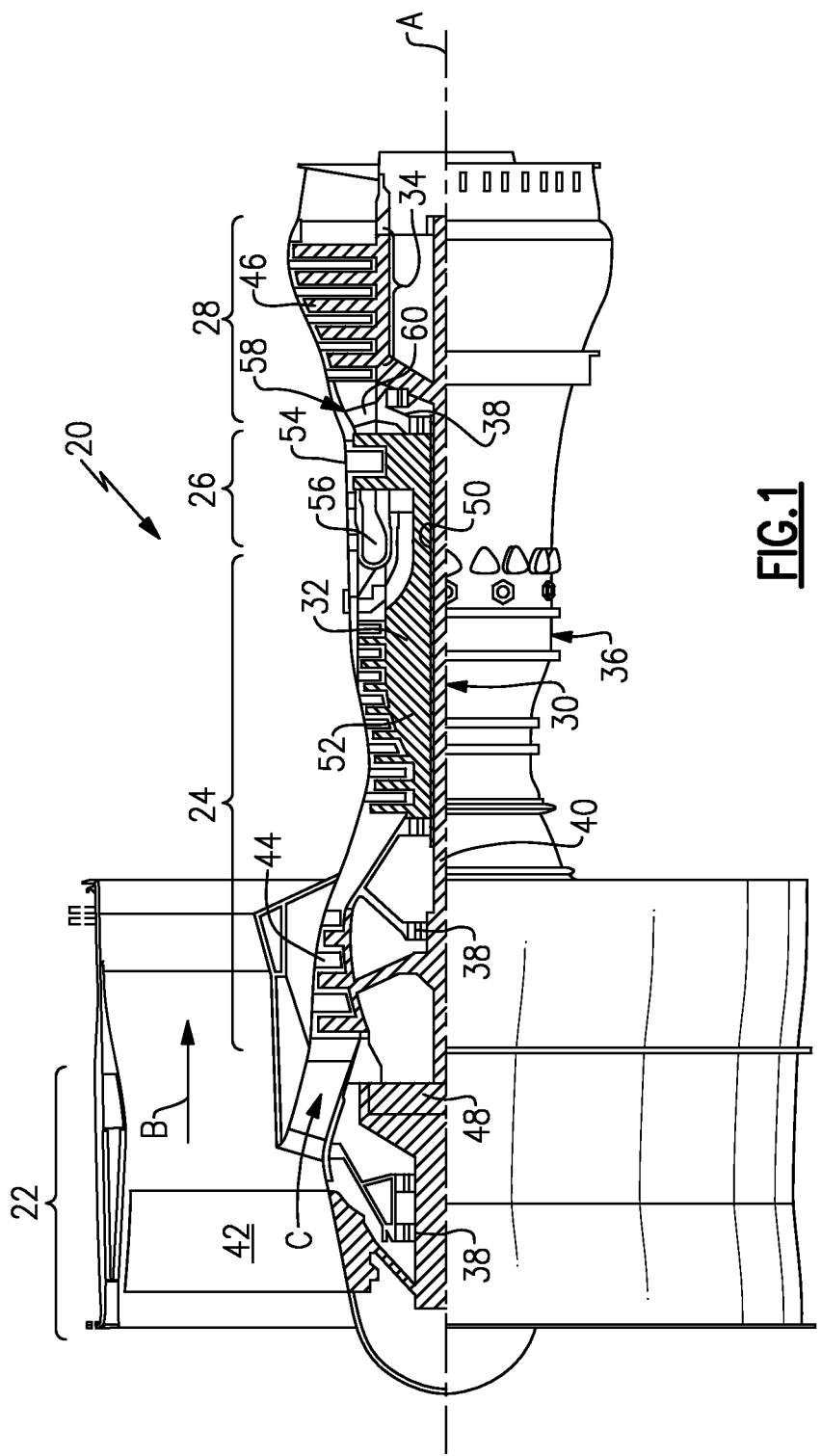
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 3:
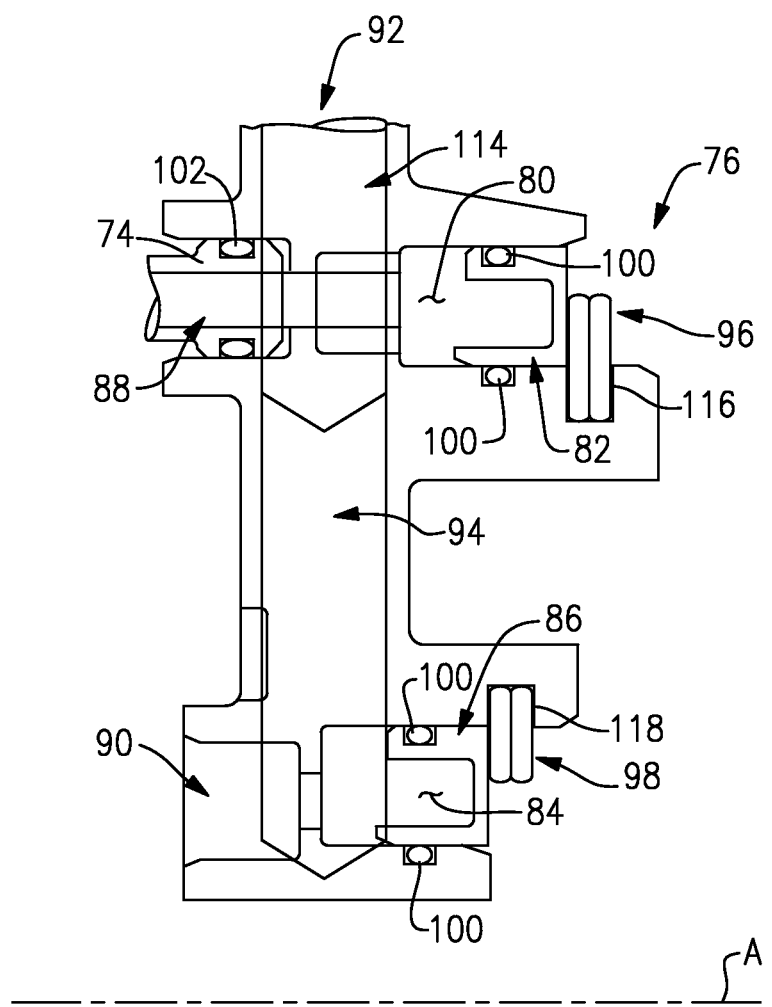
FIG. 3 is an enlarged cross-section of a portion of the example lubricant manifold.

Referring to FIGS. 2 and 3, example geared architecture 48 includes a sun gear 64 that is driven by a connector shaft 62 about the axis A. The sun gear 64 in turn drives star gears 66 that are supported on journal pins 70 (in other embodiments the gears 66 could be planet gears). The star gears 66 engage a ring gear 68 that surrounds the entire geared architecture assembly 48. The journal pins 70 are supported by a carrier 72. The carrier 72 supports the journal pin 70 and also surrounds and holds the various star gears 66 in a desired relationship to the sun gear 64.

The journal pins 70 are in communication with a corresponding jump tube 74. The jump tube 74 extends through the carrier 72 and interfaces with a manifold 76. The manifold 76 defines passages for lubricant flow into the geared architecture 48. The disclosed manifold 76 is fabricated from a solid block of material. In this example, the material is forged aluminum plate stock; however other materials compatible with the operating environment of the geared architecture are also within the contemplation of this disclosure.

The example manifold 76 includes a hub portion 104 concentric about the axis A. The hub portion 104 is a complete circumferential hub extending 360° about the axis A. A first annular channel 80 is defined within the hub 104 and defines a portion of a lubricant passage. A second annular channel 84 is defined about the axis A within the hub 104 and defines a portion of another lubricant passage. The first and second annular channels 80, 84 are complete circumferential channels disposed about the axis A. Each of the first annular channel 80 and the second annular channel 84 are fed lubricant through radial passages 114, 94, respectively that communicate with openings 95 and 92, respectively for receiving lubricant from first and second lubricant supply sources (not shown).

The first annular channel 80 is disposed radially outward of the second annular channel 84. In other words, the first annular channel 80 is of a diameter that is greater than the second annular channel 84. Each of the annular channels 80, 84 include a plurality of outlets 88 (only one shown in FIG. 2) that correspond with specific features within the geared architecture 48 that receive lubricant. In this example, the first annular channel 80 includes the outlet 88 that communicates with the jump tube 74 that in turn corresponds with the journal pin 70 supporting rotation of star gear 66.

Another outlet 90 communicates with jump tube 91 that directs oil and lubricant from the second annular passage 80 into a spray bar 78. The example spray bar 78 is disposed between adjacent star gears 66 and provides for the application of lubricant to the gear interface between the star gears 66 and the central sun gear 64. Further, the spray bars 78 also provide and define a lubricant passage through which lubricant can be supplied to other portions of the geared architecture and to bearing assemblies disposed forward of the geared architecture. In this example outlet 85 communicates lubricant from opening 112 (third lubricant supply source) through jump tube 110 to the spray bar 78. Moreover, lubricant passing through the spray bar 78 can be supplied to other varying assemblies within the gas turbine engine 20.

Referring to FIG. 3 an enlarged portion of the example manifold 76 is shown and illustrates the first annular channel 80 and the second annular channel 84. Each of the annular channels 80, 84 extend 360° about the axis A within the hub 104 of the manifold 76. The channels 80, 84 receive corresponding first and second channel bowl members 82, 86. The bowl members 82, 86 received with the corresponding annular channels 80, 84 complete the desired lubricant passage such that lubricant received through one of the plurality of inlets 92 flows annularly within the corresponding annular channels 80, 84. The annular flow of lubricant provides even distribution of lubricant to the geared architecture 48.

In this example, the first bowl member 82 includes a substantially U-shaped cross-section that is received within the first annular channel 80; other shapes such as C-shaped cross-sections may also be used. Seals 100 are disposed between the first annular channel 80 and the bowl member 82 for sealing the interface between the two. In this example, a seal 100 is disposed on an inner radial surface of the annular channel 80 and a seal 100 is disposed on an outer radial surface of the annular channel 80 to seal the lubricant passage.

The first bowl member 82 is held within the annular channel 80 by a retainer 96. In this example, the retainer 96 comprises a snap ring that is held in place within a groove 116 defined in the manifold 76. The example retainer 96 is continuous about the circumference of the annular channel 80 such that the bowl member 82 is maintained within the annular channel 80. The second bowl member 86 is held in place by a second retainer 98 disposed within a second groove 118. The combination of the annular channels 80, 84 and the bowl members 82, 86 defines annular lubricant passages supplied with lubricant through one of the inlets 95 and 92, respectively. Each of the outlets 88, 90 extends axially through the hub portion 104 to communicate with the corresponding annular channels 80, 84.

Referring to FIGS. 4 and 5 with continued reference to FIG. 2, the example manifold 76 includes a plurality of flanges 106. The flanges 106 provide for attachment of the manifold 76 to the carrier 72. Each of the flanges 106 includes a lip portion 108 that is extends over a periphery of the carrier 72. The interface between the lip 108 and the outer surface of the carrier 72 is an interference fit to provide for the specific placement and retention of the manifold 76 relative to the carrier 72 and the geared architecture 48.

The manifold 76 includes the hub portion 104 within which the annular channel 80 and 84 are defined. Inlets 95 and 92 extend radially into the hub portion 104 to communicate lubricant with a corresponding one of the annular channels 80, 84. Each of the inlets 95 and 92 are defined within at least one of the flange members 106.

Each of the flange members 106 extend radially outward from the hub 104 and provide and include openings through which threaded fasteners or other fastening devices can be extended to engage and hold the manifold 76 to the carrier 72. A plurality of outlets 88 communicate with the first annular channel 80 and extend out a frontside as is shown in FIG. 5 of the example manifold 76. The example outlets 88 are spaced evenly about the circumference of the inner hub 104. In this example, the outlets 88 are centered on a corresponding flange 106. However, each of the outlets 88 could be positioned as is required to correspond with elements of the geared architecture. A single outlet 85 is positioned between flanges 106 for supplying lubricant to a feature of the geared architecture 48, or may also be provided to provide lubricant to a bearing assembly forward of the geared architecture 48.

Each of the outlets 88 receives a corresponding jump tube 74 that includes a seal 102 (FIG. 3) that engages the inner surface of each of the outlets 88. The inner or second annular channel 84 also communicates lubricant through a plurality of outlets 90. The outlets 90 are in communication with the jump tubes 110 that communicate lubricant to the spray bars 78. As appreciated, each of the outlets 88 are disposed and positioned about the hub 104 to correspond with a position of a journal pin 70 or a spray bar 78 in the example geared architecture 48. The specific location of each of the openings can be modified to accommodate different geared architecture orientations.

Referring to FIGS. 6, 7 and 8, the example lubricant manifold 76 is defined and manufactured from a single block of forged aluminum material. The hub 104 is defined such that the connector shaft 62 (FIG. 2) can extend through the manifold 76 without contact or interference. The annular channels 80 and 84 are defined by a machining operation such that the final channel can be easily observed and inspected. Because the channels 80 and 84 are open to visual inspection, the number of internal unobservable passages is at least greatly reduced, if not eliminated entirely. Moreover, the radial passages 92, 94, and 95 that extend from the flanges 106 radially inward to the hub 104 are of such a length as to provide easy cleanout, manufacture and inspection.

Referring to FIG. 8, the example manifold 76 is shown with the bowl members 82 and 86 installed or received within the corresponding annular channel 80, 84. The bowl members 82 and 86 are maintained by corresponding retainers 96 and 98. The retainers 96 and 98 can be removed to allow inspection of the annular channels 82 during maintenance of the geared architecture 48. Accordingly, each of the passages that are defined within the example manifold 76 can be visibly inspected and define a substantially external surface.

In one example embodiment of the example lubricant manifold 76 exterior surfaces are coated with anodized hard coating that can be applied to all of the surfaces including surfaces of the exposed annular channels 80, 84. Coating of the exposed annular channels 80, 84 increases operational and durability performance.

The annular orientation of the specific lubricant passages and annular channels 80 and 84 provide a substantially uniform application of lubricant to the various outlets defined within the hub portion 104 of the manifold 76. Because the annular channels 80, 84 are continuous, lubricant pressures are substantially uniform and therefore provide a consistent uniform flow of lubricant through the plurality of outlets supplying lubricant to the geared architecture 48.

Accordingly, the example lubricant manifold 76 provides improved lubricant distribution while also allowing inspection of lubricant passages once assembled to the geared architecture.

Although an example embodiment has been disclosed, a worker of ordinary skill in this art would recognize that certain modifications would come within the scope of this disclosure. For that reason, the following claims should be studied to determine the scope and content of this disclosure.

The invention claimed is:

1. A gas turbine engine comprising:
a fan including a plurality of fan blades rotatable about an axis;
a compressor section;
a combustor in fluid communication with the compressor section;
a turbine section in fluid communication with the combustor;
a geared architecture driven by the turbine section for rotating the fan about the axis; and
a manifold defining passages for directing lubricant flow to the geared architecture, the manifold including at least one annular channel and a bowl member received within the annular channel for defining at least one passage for directing lubricant.

2. The gas turbine engine as recited in claim 1, including a retainer engaged to the manifold for holding the channel bowl member within the annular channel.

3. The gas turbine engine as recited in claim 1, wherein the bowl member comprises a C-shaped or U-shaped cross-section.

4. The gas turbine engine as recited in claim 3, wherein the manifold includes first and second annular channels and first and second bowl members received within a corresponding one of the first and second annular channels.

5. The gas turbine engine as recited in claim 4, wherein each of the first and second annular channels comprises a full circumferential channel.

6. The gas turbine engine as recited in claim 1, wherein the geared architecture includes a plurality of star gears supported by a corresponding plurality of journal pins, and wherein a jump tube is attached to each of the journal pins for communicating lubricant from the annular channel to the corresponding journal pin.

7. The gas turbine engine as recited in claim 1, including at least one spray bar in communication with the annular channel for applying lubricant to an interface between gears of the geared architecture.

8. The gas turbine engine as recited in claim 1, including a carrier for supporting gears of the geared architecture, wherein the manifold includes at least one radially extending flange for mounting the manifold to the carrier.

9. The gas turbine engine as recited in claim 1, including at least one seal for sealing the interface between the bowl member and the annular channel.

10. The gas turbine engine as recited in claim 9, wherein the at least one seal includes an outer seal and an inner seal.

11. A gear system for a gas turbine engine comprising:
a sun gear;
a plurality of gears drivable by the sun gear;
a carrier supporting the plurality of gears; and
a manifold attached to the carrier for communicating lubricant, the manifold including a hub with a first channel and a first bowl member received within the first channel for defining a first lubricant passage.

12. The gear system as recited in claim 11, including a second channel and a second bowl member received within the second channel for defining a second lubricant passage.

13. The gear system as recited in claim 12, wherein at least one of the first and second channels comprises an annular channel extending circumferentially about the hub.

14. The gear system as recited in claim 12, wherein the first bowl member and the second bowl member comprise a C-shaped and/or U-shaped cross-sections.

15. The gear system as recited in claim 11, comprising a plurality of journal pins, wherein each of the journal pins corresponds to, and supports rotation of, a corresponding one of the plurality of gears.

16. The gear system as recited in claim 15, including a plurality of outlets in communication with the first lubricant passage and a jump tube engaged with each of the journal pins, wherein an end of each of the jump is received within a corresponding one of the plurality of outlets.

17. The gear system as recited in claim 15, comprising the carrier supporting the journal pins.

18. The gear system as recited in claim 17, including a plurality of flanges extending radially outward from the hub for attachment to the carrier.

19. The gear system as recited in claim 18, including an inlet for supplying lubricant to at least the first lubricant passage disposed within at least one of the plurality of flanges.

20. The gear system as recited in claim 11, wherein the plurality of gears are star gears.

* * * * *